United States Patent
Bathey

(10) Patent No.: US 6,662,493 B1
(45) Date of Patent: Dec. 16, 2003

(54) TREE WATERING DEVICE

(75) Inventor: Richard A. Bathey, Mission Viejo, CA (US)

(73) Assignee: Amkor Technology, Inc., Chandler, AZ (US)

( * ) Notice: Subject to any disclaimer, the term of this patent is extended or adjusted under 35 U.S.C. 154(b) by 0 days.

(21) Appl. No.: 10/198,024

(22) Filed: Jul. 18, 2002

(51) Int. Cl.$^7$ ............................................... A01G 29/00
(52) U.S. Cl. ....................................................... 47/48.5
(58) Field of Search ................................ 47/40.5, 48.5, 47/79; 340/620

(56) References Cited

U.S. PATENT DOCUMENTS

| | | | | |
|---|---|---|---|---|
| 1,586,676 A | * | 6/1926 | Heath | 47/74 |
| 5,279,071 A | | 1/1994 | McDougall | |
| 5,410,839 A | | 5/1995 | Granger | |
| 5,446,993 A | * | 9/1995 | Cullen | 47/48.5 |
| 5,535,547 A | * | 7/1996 | Brunengo | 47/40.5 |
| 5,615,516 A | * | 4/1997 | Brown | 47/40.5 |
| 5,791,083 A | * | 8/1998 | Giangrossi | 47/40.5 |
| 5,867,929 A | | 2/1999 | Jung et al. | |
| 6,073,390 A | * | 6/2000 | Baudier | 47/40.5 |
| 6,167,651 B1 | * | 1/2001 | Luddy | 47/40.5 |

OTHER PUBLICATIONS

Aquafil USA. "Aquafil Christmas Tree Watering System". http://www.aquafilint.com/.
LeisureMore. "Water Wedgie". http://www.leisuremore-.com/ChristmasTreeSupplies/watersolutions.htm.
Russell, Steve. "AquaFir." http://www.aquafir.com/.

* cited by examiner

*Primary Examiner*—Charles T. Jordan
*Assistant Examiner*—Francis T. Palo
(74) *Attorney, Agent, or Firm*—Stetina Brunda Garred & Brucker

(57) ABSTRACT

A tree watering device suitable for indicating the level of water pooled near the trunk of the tree for hydrating purposes. In one embodiment, the device comprises a hollow conduit with a perforated end cap on one end and a funnel on the other. The device also comprises a float positioned within the conduit and a rod attached to the float. The float rises and falls within the conduit as the level of the water pooled near the trunk rises and falls. As a result of the float's movement, the rod rises and falls, thereby indicating the level of water hydrating the tree. Due to the length of the device, a user may fill it without excessive bending or reaching, and the funnel inhibits spillage of water when filling the device. Also, the end cap inhibits clogging of the device.

33 Claims, 2 Drawing Sheets

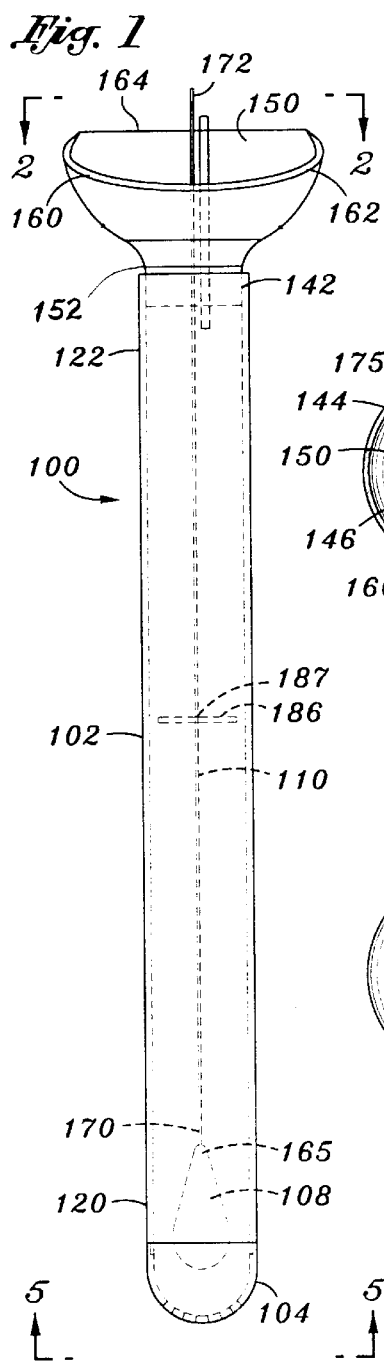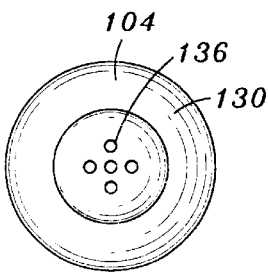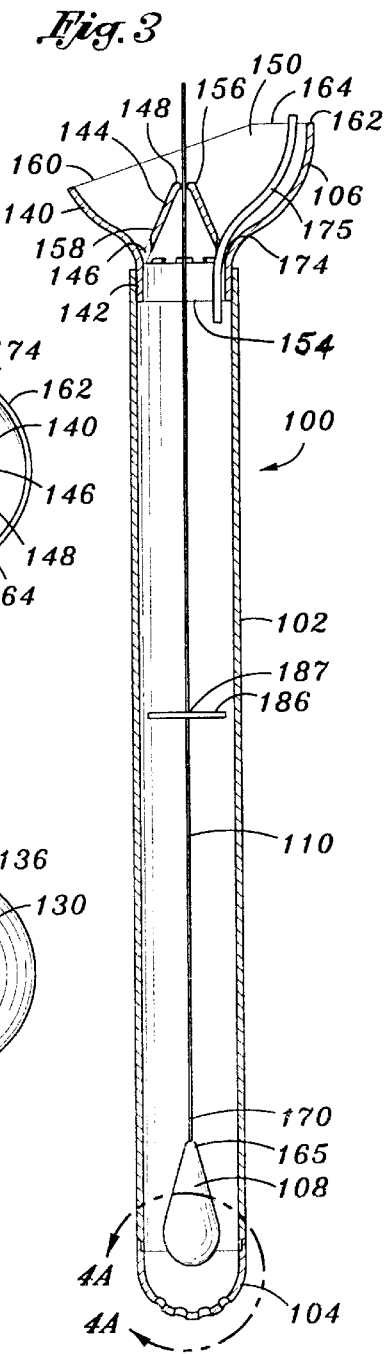

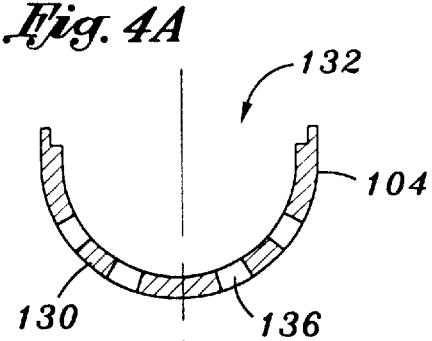
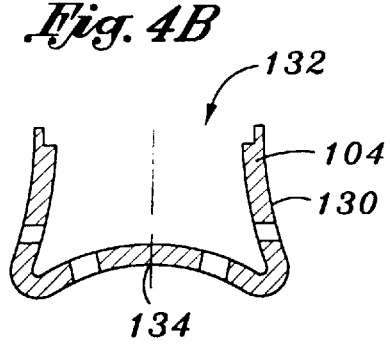
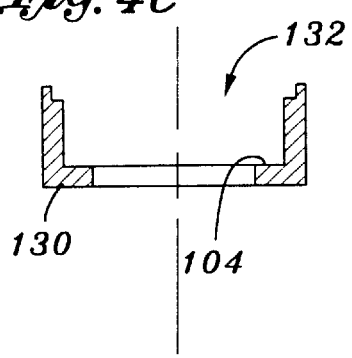
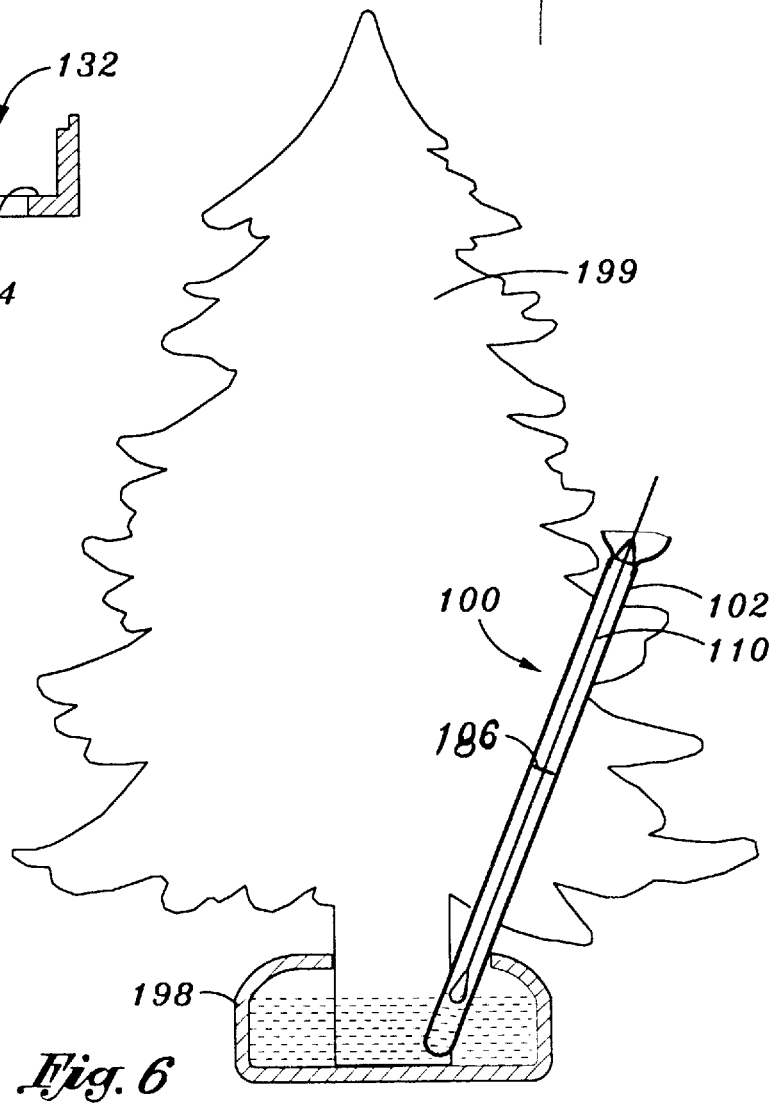

TREE WATERING DEVICE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The following generally relates to tree watering devices and, more specifically, to a tree watering device comprising a straight axis, a funnel, and/or an end cap to thereby facilitate filling and positioning of the device.

Trees traditionally decorate homes, especially during the Christmas holiday. The trees are typically mounted such that the freshly-cut trunk of the tree resides in water to keep the tree properly hydrated. If the tree is not properly watered in this way, the tree can dry out and become unsightly by losing needles, and further can become a fire hazard due to its dry condition.

The tree owner typically must water the tree frequently. For instance, some trees must be watered every twelve hours. Thus, such a watering schedule can be quite inconvenient. Many prior art innovations have attempted to alleviate this inconvenience. For instance, the watering device disclosed in U.S. Pat. No. 5,279,071 and the AquaFir™ automatic tree watering device both include water reservoirs that automatically route water into the tree stand when the water level in the stand falls below a certain level. The reservoirs included in both devices are positioned near the floor, adjacent the tree stand. As a result, users typically must bend down and sometimes reach excessively under the tree in order to fill the reservoirs due to their location. Bending over as such can be physically challenging for many, especially considering the user is bending over with the added weight of a water jug or like filling device. Disadvantageously, the owner might also accidentally shake tree needles loose when reaching underneath the tree to fill the reservoir.

Another tree watering device disclosed in U.S. Pat. No. 5,410,839 includes a conduit that defines a filling end, which can be positioned at a certain height above the floor, and a drainage end, which can be positioned adjacent to the tree stand. The water poured into the filling end then travels down through the conduit until it reaches and pools in the tree stand, keeping the tree hydrated. Because the filling end is positioned at a height above the floor, the user can pour water into the filling end without having to bend over excessively.

Moreover, the device in the '839 Patent also includes a light indicator that visually signals the user when the water level near the tree trunk falls below a certain level. However, this light can be disadvantageous for a multitude of reasons. For instance, the light indicator may be visually unappealing because it may not match the color scheme of decorative lights placed on the tree. Also, the battery that powers the light can die, causing the indicator light to become nonfunctional, and the user might realize this fact only after the tree has dried out. Similarly, other devices, such as the device disclosed in U.S. Pat. No. 5,867,929, include similar electric indicators. In one embodiment, the device disclosed in the '929 Patent includes an audible electric alarm that sounds when the water in the tree stand falls below a certain level. As before, the battery that powers such a device might die, causing the user to inadvertently allow the tree to dry out. Furthermore, the audible alarm could annoy the user.

U.S. Pat. No. 5,535,547 discloses another device in the prior art. The device includes a hollow conduit that defines a filling end, which can be positioned at a desired elevation, and a drainage end, which can be positioned adjacent to the tree stand. Thus, this device addresses the need for a watering device that does not require excessive bending or reaching when filling. Also, the device disclosed in the '547 patent includes an indicator rod positioned through the conduit and attached to a member that floats up and down depending on the amount of water in the tree stand. As water is added to the stand, the float rises, causing the top of the indicator rod to extend out of the conduit, thereby indicating that the water level is sufficient. As the tree absorbs water and the water in the stand lowers, the float lowers, causing the top of the indicator rod to sink into the conduit, thereby indicating that the water level is insufficient. Thus, the functionality of the indicator does not depend on an electric power source, and is therefore more failsafe. Also, since the indicator provides quiet, non-illuminated, visual indication, the indicator in the '547 Patent is less likely to annoy the user.

However, the device disclosed in the '547 Patent is disadvantageous for other reasons. More specifically, the filling end of the conduit is bent relative to the drainage end. This configuration increases manufacturing costs because bending the conduit requires a special manufacturing process. Also, the indicator rod is bent to conform to the bend in the conduit; however, because of this bend, the rod and the attached float travels both vertically and horizontally inside the conduit so that the top of the indicator rod can extend out of the conduit. Disadvantageously, the indicator rod may tend to butt up against the inner wall of the conduit due to this multi-axis movement and fail to properly indicate the water level. Furthermore, the drainage end of the conduit has a larger diameter than the rest of the conduit and is open-ended. Because of its larger diameter, the drainage end can be difficult to push between the often thick boughs of the Christmas tree, and the drainage end can become clogged with needles and twigs because it is open. Finally, the filling end comprises a relatively small opening through which the user can pour water into the conduit. Spillage is likely to occur because of the small size of this opening.

Therefore, it is noted that there is an ongoing need for a tree watering device that does not require the user to excessively bend or reach while filling, which is unlikely to be audibly or visually unappealing. Also, the device should be inexpensive to manufacture and easy to position within the tree. Moreover, the device should have little tendency to clog and the indicator rod should have little tendency to bind up within the device. Finally, there is a need for a tree watering device that can be filled easily, with little chance of spilling the water.

BRIEF SUMMARY OF THE INVENTION

In accordance with the aforementioned needs, herein disclosed is an improved tree watering device suitable for indicating a level of water surrounding a tree. The watering device comprises a conduit which defines a bottom end and a top end. The conduit further defines a passage for water to flow between the bottom and top ends, and the passage defines a generally straight first axis between the top and bottom ends. In one aspect, the watering device further comprises an end cap attached to the bottom end of the conduit, and the end cap comprises at least one opening through which the water may pass. In one embodiment, the end cap has a convex portion that fits against the tree trunk to thereby inhibit rotation of the device. Furthermore, the watering device comprises a float which is buoyant and positioned within the passage. Also, the watering device comprises a rod fixedly attached to the float and extending through the passage. The rod extends above the second end of the conduit when the water level is sufficient.

In this embodiment of the watering device, the end cap effectively limits access to the interior of the conduit. Thus, as the watering device is positioned between the boughs of the tree (i.e., jammed downward between the branches of the tree), the end cap inhibits needles, twigs, and other particulate from entering the conduit. Advantageously, the watering device is less likely to clog due to the end cap.

In another aspect, a tree watering device is disclosed, suitable for indicating a level of water surrounding a tree trunk. The watering device comprises a conduit which defines a bottom end, a top end, and an axis extending there between. The conduit further defines a passage for water to flow between the bottom and top ends. Moreover, the watering device comprises a funnel including an opening that is larger than the passage of the conduit, and which is fixedly attached to the second end of the conduit. Also, the watering device further comprises a float which is buoyant and is positioned within the passage. Furthermore, the watering device comprises a rod fixedly attached to the float and extending through the passage. The rod extends above the funnel when the level of water is sufficient.

Due to its relatively large diameter, the funnel allows water to be poured into the watering device from a wider range of positions above the watering device. Advantageously, inadvertent spillage of water is reduced.

In various other embodiments of the watering device, the diameter of the conduit is relatively small such that the watering device can more easily be positioned within the tree without excessive reaching or bending. Also in the preferred embodiment, the axis of the device is generally straight from top to bottom, thereby reducing manufacturing costs and reducing the chance that the rod will bind up inside the conduit.

BRIEF DESCRIPTION OF THE DRAWINGS

These as well as other features of the present invention will become more apparent upon reference to the drawings wherein:

FIG. 1 is a side view of one embodiment of a tree watering device of the present invention;

FIG. 2 is a top view of the tree watering device of FIG. 1;

FIG. 3 is a cross sectional view of the tree watering device of FIG. 1;

FIGS. 4A, 4B, and 4C illustrate three different embodiments of end caps suitable for use with the tree watering device of FIG. 1;

FIG. 5 is a bottom view of the tree watering device of FIG. 1; and

FIG. 6 is a side view of the tree watering device of FIG. 1 shown mounted in a Christmas tree.

DETAILED DESCRIPTION OF THE INVENTION

Referring now to the drawings wherein the showings are for purposes of illustrating preferred embodiments of the present invention only, and not for purposes of limiting the same, FIGS. 1–3 and FIG. 5 illustrate one embodiment of a tree watering device 100 (i.e., "waterer"). Generally, the device 100 comprises a conduit 102, an end cap 104, a funnel 106, a float 108, and a rod 110. For purposes of this application, the device 100 will be discussed in relation to Christmas trees; however, it is understood that the device 100 could be used to keep a variety of trees hydrated without departing from the spirit of the invention.

As shown in FIGS. 1 and 3, the conduit 102 of the device 100, in one embodiment, is a hollow, tubular member of constant diameter that defines a first end 120 and a second end 122. In one embodiment, the conduit 102 is approximately forty-eight (48) inches long. The diameter of the conduit 102 is preferably small (e.g., one and one quarter (1.25) inches) so as to facilitate easy positioning of the conduit 102 between the thick boughs of the Christmas tree. As will be described in greater detail below, the conduit 102 routes water from the second end 122 to the first end 120 in order to keep a tree properly hydrated.

As is shown in FIG. 1 and in FIGS. 3–5, the end cap 104 of the device 100 comprises a wall 130. The wall 130 is shaped to define an opening 132, and the opening 132 has approximately the same diameter as the diameter of the first end 120 of the conduit 102 such that the end cap 104 can be fit to the first end 120 with adhesives, such that the opening 132 aligns with the first end 120. In another embodiment, the opening 132 is sized such that the end cap 104 can be frictionally fit to the conduit 102.

The wall 130 is shaped like a semisphere in the embodiments shown in FIGS. 1 and 3 and in FIGS. 4A and 5. The wall 130 is shaped like a flat disk in the embodiment shown in FIG. 4C. In the embodiment shown in FIG. 4B, the bottom of the wall 130 of the end cap 104 has a concave portion 134. Using the embodiment shown in FIG. 4B, the device 100 is preferably positioned against the tree such that the trunk of the tree is positioned within the concave portion 134, thereby inhibiting the device 100 from rotating.

In its multiple embodiments, the end cap 104 further comprises at least one hole 136 formed through the thickness of the wall 130. Preferably, the holes 136 each have a small diameter to inhibit twigs and needles from entering the device 100 from outside the end cap 104, especially when positioning the device 100 in the tree, when it is pushed through many boughs. Thus, the device 100 is less likely to become clogged as compared to a similar device (like those in the prior art) that do not have an end cap 104. Also, as will be described in greater detail below, the holes 136 allow water inside the conduit 102 to drain out adjacent to a tree trunk to thereby keep the tree hydrated.

FIGS. 1–3 illustrate one embodiment of the funnel 106. This embodiment of the funnel 106 comprises a bowl 140 which is a hollow, semispherical member that defines a large diameter first opening 150. In one embodiment, the diameter of the first opening 150 equals three and one quarter (3.25) inches. A second opening 152 is formed on the bottom of the semispherically-shaped bowl 140. The second opening 152 has approximately the same diameter as the conduit 102.

As shown in detail in FIGS. 1 and 3, the funnel 106 further comprises a stem 142, which is a short hollow tube integrally attached to the bowl 140 around the second opening 152. The stem 142 extends downward therefrom so as to define a third opening 154 that has a diameter approximately the same as the diameter of the conduit 102. As shown in FIGS. 1 and 3, the funnel 106 is attached to the conduit 102 such that the third opening 154 is aligned with the second end 122 of the conduit 102. In one embodiment, the funnel 106 is attached to the conduit 102 with adhesives, and in an alternative embodiment, the funnel 106 is frictionally attached to the conduit 102. As will be discussed in greater detail below, a user pours water into the funnel 106 through the first opening 150 to thereby keep a tree hydrated. The funnel 106 inhibits water spillage because the diameter of the first opening 150 is relatively large, and as such, the bowl 140 is able to catch water poured from a wider range of positions and route it into the conduit 102 through the stem 142.

In the embodiment shown, the funnel 106 further comprises a cone 144, which is a hollow, conically-shaped member defining a small diameter first end 156 and a larger diameter second end 158. The cone 144, is positioned vertically within the bowl 140. As shown, the diameter of the second end 158 of the cone 144 is sized such that it substantially covers the second opening 152 of the bowl 140. The cone 144 comprises a support hole 148, which extends through the first end 156 of the cone 144. As will be discussed in greater detail below, the rod 110 extends through and is supported by the periphery of the support hole 148.

The cone 144 also comprises a plurality of drainage holes 146. Each drainage hole 146 extends through the second end 158 of the cone 144 so as to provide a fluid pathway between the bowl 140 and the stem 142. In the embodiment shown, the funnel 106 comprises eight drainage holes 146 spaced evenly around the second end 158 of the cone 144. Furthermore, in one embodiment, the diameter of the typical drainage hole 146 is 0.04 inches. As will be described in greater detail below, the drainage holes 146 allow water to pass from the bowl 140 to the stem 142 and ultimately into the other portions of the device 100 so as to keep a tree hydrated. Also, because of the radial position of the drainage holes 146, when water moves from the funnel 106 to the conduit 102, the water largely contacts and flows down the inner diameter of the conduit 102. As will be discussed below, the water is more likely to flow around the rod 110 and float 108, such that the rod 110 and float 108 can more immediately indicate the water level.

In one embodiment, the cone 144 also comprises an aerating hole 174. The aerating hole 174 is similar to the drainage holes 146 except that it is large enough to allow a standard hollow tube 175 to extend there through. Preferably, the tube 175 is long enough to extend from above the funnel 106, down through the aerating hole 174, and into the conduit 102. As such, the tube 175 allows air to pass from the conduit 102 to outside the watering device 100. Thus, as water is poured into the funnel 106, the water can drain more readily through the drainage holes 146 and into the conduit 102 because the air in the conduit 102 can more easily escape.

As stated above, the bowl 140 is shaped like a hollow semisphere in the embodiment shown. As such, a lip or rim 162 is defined on the bowl 140. In the embodiment shown in FIGS. 1–3, the rim 162 is split into two sections: a straight section 164 and an angled section 160. The straight section 164 of the rim 162 lies generally perpendicular to the main axis of the funnel 106. However, the angled section 160 extends at an obtuse angle relative to the straight section 164. As will be described in greater detail below, the tree watering device 100 is preferably positioned at an angle, and in one embodiment, the tree watering device 100 is positioned such that the angled section 160 lies parallel to the floor. As such, more of the interior of the funnel 106 is exposed in the vertical direction due to the inclusion of the angled section 160. Thus, the angled section 160 advantageously facilitates pouring water straight down into the funnel 106 when the device 100 is positioned at an angle, and less spillage is likely to occur.

Considering FIGS. 1 and 3 in conjunction, one embodiment of the float 108 is illustrated as having a pear-like shape. Other embodiments of the float 108 have a spherical shape. The float 108 is constructed with lightweight, buoyant material. For example, the float 108 is constructed from lightweight plastic and is hollow, in one embodiment. In another embodiment, the float 108 is made out of solid foam. In a specific embodiment, the float 108 is a 0.875 inch ball made out of Plastifoam. As shown in FIG. 1, the float 108 is positioned in the device 100 near the first end 120 of the conduit 102. Due to its buoyancy, the float 108 floats atop the water inside the device 100, and as will be described below in more detail, raises and lowers the rod 110 to indicate the water level in the device 100.

As stated, the device 100 also comprises a rod 110. The rod 110 is a lightweight, rigid, strong, cylindrical member, approximately as long as the conduit 102. In one embodiment, the rod 110 is a 0.060 inch diameter composite shaft. As such, the rod 110 defines a first end 170 and a second end 172. Preferably, the first end 170 of the rod 110 is attached to a top point 165 of the float 108 and extends upward therefrom through the conduit 102. In one embodiment, the rod 110 comprises a cap (not shown) attached to the second end 172 so that the second end 172 has a larger diameter and is therefore safer.

In one embodiment, the rod 110 comprises a center guide 186. The center guide 186 is a flat, thin member with a length slightly less than the inner diameter of the conduit 102. Also, the center guide 186 includes a hole 187 extending through its center. The rod 110 extends through the hole 187 to attach the center guide 186 to the rod 110. In one embodiment, the center guide 186 is attached near the middle of the length of the rod 110. When the rod 110 is inside the conduit 102, the center guide 186 butts up against and can slide along the inner diameter of the conduit 102 to thereby support the rod 110 and keep it aligned with the axis of the conduit 102 as it moves. Preferably, the length of the center guide 186 is designed so as to minimize friction between the center guide 186 and the inner diameter of the conduit 102. As will be described in greater detail below, the center guide 186 allows for more accurate readings of the water level.

In another embodiment, the center guide 186 is attached to the inner diameter of the conduit 102 and extends inward therefrom. Also, the center guide 186 includes a hole 187 extending vertically along the axis of the conduit 102. As such, the rod 110 extends through the hole 187 and is supported by the edge of the hole 187 as it moves, thereby keeping the rod 110 aligned with the axis of the conduit 102.

Also, the rod 110 extends through the support hole 148 in the cone 144 of the funnel 106. Thus, the second end 172 of the rod 110 is largely supported by the edge of the support hole 148 and the center guide 186 so that the rod 110 stays aligned along the axis of the conduit 102.

As will be described in greater detail below, the rod 110 extends out of the device 100 when the water level therein is high, thereby indicating to the user that no additional water need be added. Conversely, the rod 110 is largely hidden inside the device 100 when the water level is low, thereby indicating to the user that water should be added.

Turning now to FIG. 6, the tree watering device 100 is illustrated as positioned within a Christmas tree 199. In one embodiment, the device 100 is supported by the boughs of the tree 199 and due to the high number of boughs, the device 100 remains in place without rotating. In another embodiment, the device 100 is anchored to the boughs of the tree 199 with ties (not shown) that are tied around both the boughs and the device 100. In still another embodiment, the end cap 104 includes the concave portion 134 as shown in FIG. 4B, and the device 100 is positioned such that the trunk of the tree resides within the concave portion 134. As such, the concave portion 134 inhibits the device 100 from rotating.

The tree 199 is positioned within a tree stand 198, widely known for supporting a Christmas tree 199 in a vertical orientation and containing a volume of water near the trunk of the tree 199 to thereby keep the tree 199 hydrated. As shown, the end cap 104 and first end 120 of the conduit 102 are placed in the tree stand 198. Water is able to flow from the end cap 104 to the tree stand via the holes 136 in the end cap 104. More specifically, if water is poured in the funnel 106, the water travels down the conduit 102, into the end cap 104, out the holes 136, and into the tree stand 198 to thereby hydrate the tree 199.

Preferably, when the water level in the tree stand 198 is sufficiently high, water remains in that portion of the conduit 102 adjacent the end cap 104, and the float 108 rises to the surface of the water contained therein as a result of its buoyancy. Because the rod 110 is attached to the float 108, the rod 110 rises in tandem with the float 108. The rod 110 is preferably long enough such that, when the rod 110 rises, the second end 172 of the rod 110 extends out of the device 100 above the funnel 106. Thus, when the user sees the rod extending out of the device 100, the user is informed that the water level in the stand 198 is sufficient and no more water need be added. Conversely, when the tree 199 absorbs the water contained in the tree stand 198, the water level sinks, and the water level in the device 100 lowers. Also, the float 108 and the attached rod 110 move with the water level, and the second end 172 of the rod 110 moves further into the funnel 106. Thus, when the user fails to see the rod 110 (or sees only a short length of the rod 110 extending out of the device 100), the user is informed that the water level in the stand 198 is insufficient and more water needs to be added. Advantageously, the user is more likely to be informed about the water level in the tree stand 198, and the tree 199 is more likely to stay hydrated.

Furthermore, it is noted that the rising and falling of the rod 110 is virtually silent. Thus, indication of the water level in the stand 198 is achieved without the need for possibly annoying audible signals (e.g., alarms used in the prior art). Thus, the device 100 is less likely to be audibly unappealing.

Likewise, in one embodiment, all components of the tree watering device 100 are colored green. As such, the device 100 is more likely to match the natural color of the tree 199 and be camouflaged therein. In another embodiment, all components are made out of a transparent material. As such, the device 100 is less visible because the tree's natural color shows through the device 100. Thus, these embodiments of the device 100 are less likely to be visually unappealing to the user because they are effectively hidden from sight.

Moreover, it is noted that the method of indicating the water level (i.e., the rising and falling of the rod 110) requires no batteries unlike other devices in the prior art. Thus, the device 100 is more likely to remain functional over longer periods of time.

In one embodiment not shown, the second end 172 of the rod 110 is graduated. For instance, the rod 110 in this embodiment comprises horizontal lines or other indicia. When the rod 110 extends further out of the funnel 106, more of the graduations are exposed. Conversely, when the rod 110 falls further into the device 100, less of the graduations are exposed. Thus, the graduations on the rod 110 allow the user to gauge the amount of water in the stand 198 with more accuracy.

Preferably, the device 100 is positioned at an angle with respect to the trunk of the tree 199. As such, the end cap 104 can be positioned within the tree stand 198 and yet, the funnel 106 can be positioned near the exterior of the tree 199 at an elevated height. Advantageously, pouring water into the funnel 106 can be done without having to reach excessively into the tree because the funnel 106 is positioned at the exterior of the tree. Similarly, due to the elevation of the funnel 106, filling can be performed without having to bend down excessively toward the tree stand 198.

It is also noted that the components comprising the tree watering device 100 are largely uniform, and can be simply assembled with adhesives or frictional fits. Advantageously, this simplicity lowers manufacturing costs. Likewise, it is likely less expensive to make the conduit 102 that is a straight tube as compared with the cost of making a conduit with a rigid bend, as is disclosed in the prior art.

Furthermore, it is noted that the straightness of the conduit 102 and the support provided by the center guide 186 and the support hole 148 allow the rod 110 to move in a uniform, guided direction. Thus, the rod 110 is less likely to bind up against the internal surfaces of the conduit as compared to the prior art device with a free-floating bent rod that moves multidirectionally. Advantageously, the rod 110 is more likely to function in a wider variety of conditions.

Also, it is noted that the majority of the device 100, excluding the funnel 106, is of a relatively small diameter. As stated above, specific embodiments of the conduit 102 and end cap 104 have one and one quarter (1.25) inch diameters. It is appreciated that such a small-diameter member can be positioned between the boughs of a Christmas tree 199 relatively easily. The user is able to jam the device 100 through the tree 199 from a standing position, without having to bend over excessively. Thus, positioning the device 100 is unlikely to be inconvenient for the user.

On a related note, the end cap 104 largely closes off access to the first end 120 of the conduit 102. Thus, the end cap 104 inhibits twigs, needles, and other particulate from entering the device 100, especially when jamming the device 100 down between the boughs of the tree 199 during the initial positioning of the device. Thus, the device 100 is less likely to become clogged with such particulate.

Finally, although most components of the device 100 are of a relatively small diameter, the funnel 106 is of a comparatively large diameter. As such, pouring the water into the device 100 is facilitated by the funnel 106. Also, one embodiment of the funnel comprises the angled section 160 to thereby expose more of the interior of the funnel 106 from a vertical position. More specifically, even with the device 100 positioned at an angle relative to the trunk of the tree 199, the angled section 160 exposes a larger portion of the already large diameter funnel 106 from a vertical vantage point. Thus, due to the relatively large diameter of the funnel 106 and because the angled section 160 exposes the funnel's 106 interior, water need not be poured from directly above the conduit 102. Instead, water can be poured from a wider range of positions above and around the funnel 106. Advantageously, these features inhibit spillage of the water.

This disclosure provides exemplary embodiments of a tree watering device 100. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A tree watering device comprising:
    a conduit which defines a bottom end, a top end, and a passage for water to flow between the top and bottom ends, the passage formed by a straight tube defining a straight first axis which extends through radial center points of the top and bottom ends;
    a float which is buoyant, positioned within the passage; and
    a rod fixedly attached to the float and extending through the passage, the rod extending above the top end of the conduit when the level of water within the conduit reaches a prescribed level.

2. The tree watering device of claim 1, further comprising a funnel defining a first opening, which is larger than the passage, and including a stem which is fixedly attached to the top end, the stem being coaxially aligned with the first axis and fluidly communicating with the passage and the first opening.

3. The tree watering device of claim 2, wherein the funnel includes a rim having:
    a straight portion extending along a first plane that is generally perpendicular to the first axis; and
    an angled portion extending along a second plane that lies at an angle relative to the first axis.

4. The tree watering device of claim 2, wherein the funnel includes support means suitable for supporting the rod.

5. The tree watering device of claim 4, wherein the support means comprises a conical element including an aperture through which the rod extends and a plurality of drainage holes through which water passes from the funnel to the passage.

6. The tree watering device of claim 2, wherein the funnel further comprises aerating means through which air can pass from the passage to an area outside the tree watering device.

7. The tree watering device of claim 1, further comprising removable end cap attached to the bottom end of the conduit, the end cap having a radial center point and including at least one opening through which water may pass, the first axis passing through the radial center point of the end cap.

8. The tree watering device of claim 7, wherein the end cap has a flat configuration.

9. The tree watering device of claim 7, wherein the end cap has a semispherical configuration.

10. The tree watering device of claim 7, wherein the end cap includes a concave portion suitable for positioning against the tree for supporting and preventing rotation of the watering device.

11. The tree watering device of claim 1, wherein the conduit is made out of a material having a green color.

12. The tree watering device of claim 1, wherein the conduit is made out of a transparent material.

13. The tree watering device of claim 1, wherein the conduit is between three and five feet long.

14. The tree watering device of claim 13, wherein the conduit is approximately four feet long.

15. The tree watering device of claim 1, wherein the conduit is between three quarters (0.75) and one and three quarter (1.75) inches in diameter.

16. The tree watering device of claim 15, wherein the conduit is approximately one and one quarter (1.25) inches in diameter.

17. The tree watering device of claim 1, wherein the rod is graduated.

18. The tree watering device of claim 1, further comprising a center guide positioned within the passage, wherein the center guide supports the rod.

19. The tree watering device of claim 1, wherein the end cap has a shape which is radially symmetric about the first axis.

20. A tree watering device suitable for indicating a level of water surrounding a tree trunk, comprising:
    a conduit which defines a bottom end, a top end, and a passage for water to flow between the top and bottom ends, the passage formed by a rigid straight tube defining a straight first axis which extends through radial center points of the top and bottom ends;
    a funnel defining an opening that is larger than the passage, including a stem which is attached to the top end and fluidly communicating with the passage and the opening;
    a float which is buoyant, positioned within the passage; and
    a rod fixedly attached to the float and extending through the passage, wherein the rod extends above the funnel when the level of water reaches a prescribed level.

21. The tree watering device of claim 20, further comprising a removable end cap attached to the bottom end of the conduit, wherein the end cap comprises at least one opening through which water may pass.

22. The tree watering device of claim 21, wherein the axis passes through radial center points of the stem and the end cap.

23. The tree watering device of claim 21, wherein the end cap includes a concave portion suitable for positioning against the tree trunk for supporting and preventing rotation of the watering device.

24. The tree watering device of claim 20, wherein the funnel includes a rim, wherein the rim includes:
    a straight portion extending along a first plane that is generally perpendicular to the axis; and
    an angled portion extending along a second plane that lies at an angle relative to the axis.

25. The tree watering device of claim 20, wherein the funnel includes a support means which supports the rod.

26. The tree watering device of claim 25, wherein the support means comprises a conical element including an aperture through which the rod extends and a plurality of drainage holes through which water passes from the funnel to the passage.

27. The tree watering device of claim 20, further comprising a center guide positioned within the passage wherein the center guide supports the rod.

28. The tree watering device of claim 20, wherein the funnel further comprises aerating mean through which air can pass from the passage to an area outside the tree watering device.

29. The tree watering device of claim 20, wherein the end cap has a shape which is radially symmetric about the first axis.

30. A tree watering device comprising:
    a conduit which defines a bottom end, a top end, and a passage for water to flow between the top and bottom ends, the passage defining a generally straight first axis which extends between the top and bottom ends;
    a float which is buoyant, positioned within the passage; and
    a rod fixedly attached to the float and extending through the passage, the rod extending above the top end of the conduit when the level of water within the conduit reaches a prescribed level, wherein the support means comprises a conical element including an aperture through which the rod extends and a plurality of drainage holes through which water passes from the funnel to the passage.

31. A tree watering device comprising:

a conduit which defines a bottom end, a top end, and a passage for water to flow between the top and bottom ends, the passage defining a generally straight first axis which extends between the top and bottom ends;

a float which is buoyant, positioned within the passage; and a rod fixedly attached to the float and extending through the passage, the rod extending above the top end of the conduit when the level of water within the conduit reaches a prescribed level, wherein the end cap includes a concave portion suitable for positioning against the tree for supporting and preventing rotation of the watering device.

32. A tree watering device suitable for indicating a level of water surrounding a tree trunk, comprising:

a conduit which defines a bottom end, a top end, and a passage for water to flow between the top and bottom ends, the passage defining an axis;

a funnel defining an opening that is larger than the passage, including a stem which is attached to the top end and fluidly communicating with the passage and the opening;

a float which is buoyant, positioned within the passage; and a rod fixedly attached to the float and extending through the passage, wherein the rod extends above the funnel when the level of water reaches a prescribed level, wherein the support means comprises a conical element including an aperture through which the rod extends and a plurality of drainage holes through which water passes from the funnel to the passage.

33. A tree watering device suitable for indicating a level of water surrounding a tree trunk, comprising:

a conduit which defines a bottom end, a top end, and a passage for water to flow between the top and bottom ends, the passage defining an axis;

a funnel defining an opening that is larger than the passage, including a stem which is attached to the top end and fluidly communicating with the passage and the opening;

a float which is buoyant, positioned within the passage; and a rod fixedly attached to the float and extending through the passage, wherein the rod extends above the funnel when the level of water reaches a prescribed level, wherein the end cap includes a concave portion suitable for positioning against the tree trunk for supporting and preventing rotation of the watering device.

* * * * *

UNITED STATES PATENT AND TRADEMARK OFFICE
CERTIFICATE OF CORRECTION

PATENT NO. : 6,662,493 B1  Page 1 of 1
DATED : December 16, 2003
INVENTOR(S) : Richard A. Bathey It is certified that error appears in the above-identified patent and that said Letters Patent is hereby corrected as shown below:

<u>Title page,</u>
Item [73], Assignee, should read -- WenDan Enterprises, Inc. --

Signed and Sealed this

Twenty-seventh Day of April, 2004

JON W. DUDAS
*Acting Director of the United States Patent and Trademark Office*